United States Patent
Chin

[11] 3,895,274
[45] July 15, 1975

[54] INVERTER CIRCUIT FOR ENERGIZING STAR CONNECTED POLYPHASE COILS FOR INDUCING A TRAVELLING MAGNETIC FIELD

[75] Inventor: Tunghai Chin, Yokohama, Japan

[73] Assignee: Tokyo Shibaura Denki Kabushiki Kaisha, Kawasaki, Japan

[22] Filed: Dec. 17, 1973

[21] Appl. No.: 425,141

[30] Foreign Application Priority Data
Dec. 22, 1972  Japan............................ 47/128149

[52] U.S. Cl................ 318/227; 318/230; 318/231; 321/5
[51] Int. Cl.............................................. H02p 5/28
[58] Field of Search....... 321/5, 45 C; 318/227, 230, 318/231

[56] References Cited
UNITED STATES PATENTS

| | | |
|---|---|---|
| 3,262,036 | 7/1966 | Clarke et al............................ 321/5 |
| 3,469,169 | 9/1969 | Schlabach et al...................... 321/5 |
| 3,548,275 | 12/1970 | Inagaki et al........................ 318/227 |
| 3,707,668 | 12/1972 | Johnston............................... 321/5 |
| 3,815,003 | 6/1974 | Wiart................................. 318/227 |

*Primary Examiner*—William H. Beha, Jr.
*Attorney, Agent, or Firm*—Stevens, Davis, Miller & Mosher

[57] ABSTRACT

An inverter circuit for creating travelling magnetic field with a positive-negative voltage commutation mode comprises polyphase coils connected in star and connected to a DC source through a full wave rectifier. The full wave rectifier is connected across the source through first and second branch circuits each including switch means and a reactor, the reactors of respective branches being magnetically coupled each other. Circuitry is provided which enable the electromagnetic energy stored in the reactive element of one branch circuit to be efficiently transferred to another branch circuit without being sent back to the source.

6 Claims, 8 Drawing Figures

F I G. 1
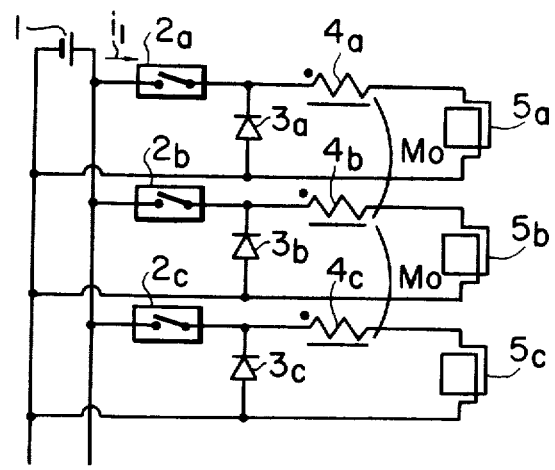
F I G. 2
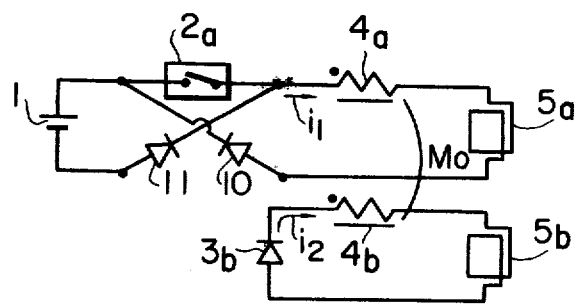

INVERTER CIRCUIT FOR ENERGIZING STAR CONNECTED POLYPHASE COILS FOR INDUCING A TRAVELLING MAGNETIC FIELD

BACKGROUND OF THE INVENTION

This invention relates to generation of a shifting or travelling magnetic field or rotating magnetic field (hereinafter merely designated as travelling magnetic field) which is necessary to drive an alternating current motor from a constant voltage direct current source, or a travelling magnetic field inducing inverter. According to a conventional system, an inverter is used to drive an AC motor from a DC source, and many types of inverter circuits have been proposed utilizing gas or vapour filled electric valves or solid state electric valves such as thyristors or transistors. However, there are many problems still remaining to be solved, such as rapid commutation, stable operation under transient conditions, compensation of the reactive component of the load, etc.

SUMMARY OF THE INVENTION

It is an object of this invention to provide a new travelling magnetic field inducing inverter based on a new principle according to which current is passed directly through electromagnetic coils from a DC source via a DC-DC converting circuit and the electromagnetic energy is transferred from one magnetic coil to the other by the action of reactors which are magnetically coupled to each other so as to induce a travelling magnetic field.

Another object of this invention is to provide a new type of an inverter circuit, especially suitable to operate an AC motor at a variable speed and capable of readily inducing a shifting or rotating field of any desired intensity and speed.

Still another object of this invention is to provide a novel inverter circuit which can operate an AC motor at a variable speed with lesser number of component elements and higher efficiency than prior art inverters.

Yet another object of this invention is to provide a new and improved inverter circuit that can drive an AC motor operating at a power factor of less than unity without the necessity of providing any power factor compensating means such as capacitors.

According to this invention these and other objects can be accomplished by providing a travelling magnetic field inducing inverter circuit comprising a source of direct current; polyphase magnetic field inducing coils connected in star; a plurality of controlled rectifier elements connected to the free terminals of the coils in a full wave rectifier configuration; a first branch circuit including a first switch means and a first reactor which are connected in series between one pole of the source and the anode electrodes of one group of the rectifier elements; a second branch circuit including a second switch means and a second reactor which are connected in series between the other pole of the source and the cathode electrodes of the other group of the rectifier elements; the first and second reactors being magnetically coupled with each other; a first diode connected between the juncture between the first switch means and the first reactor and the other pole of the source; a second diode connected between the juncture between the second switch means and the second reactor and the one pole of the source; a pair of unidirectional current conducting elements serially connected across the first and second branch circuits and poled not to pass current from said source; means to connect the neutral point of the star connected coils to the juncture between the uni-directional current conducting elements; and means for rendering ON and OFF the first and second switch means and for rendering conductive the rectifier elements in a predetermined sequence to cause the coils to create travelling magnetic field.

BRIEF DESCRIPTION OF THE DRAWINGS

In the accompanying drawings:

FIG. 1 is a connection diagram showing the principle of a positive voltage commutation type travelling magnetic field inducing inverter circuit;

FIG. 2 is a simplified connection diagram showing the principle of a negative voltage commutation type travelling magnetic field inducing inverter circuit;

DESCRIPTION OF THE PREFERRED EMBODIMENTS

Figure 3:
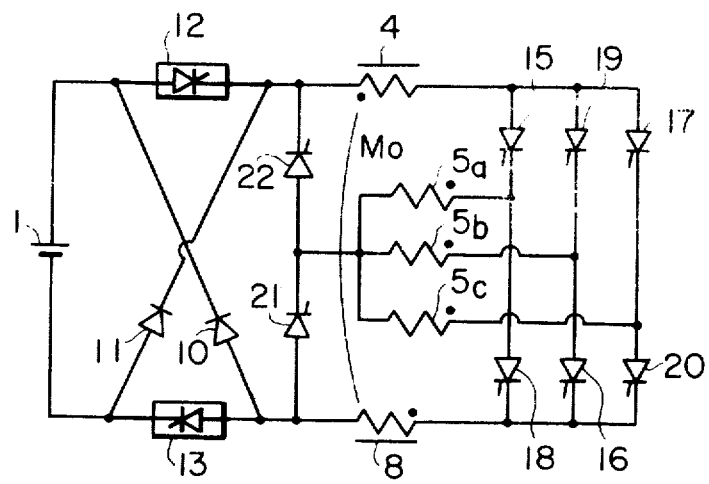
FIG. 3 is a connection diagram of one embodiment of a travelling magnetic field inducing inverter circuit embodying the invention.

To aid better understanding of the invention two types of the travelling field inducing inverter circuits will first be described. FIG. 1 shows a basic form of the positive voltage commutation type travelling field inducing inverter circuit comprising a DC source 1 such as a storage battery or rectifier, switch means $2_a$, $2_b$ and $2_c$ preferably in the form of well known thyristor choppers, or transistor choppers, reactors $4_a$, $4_b$ and $4_c$ magnetically coupled with each other, coils $5_a$, $5_b$ and $5_c$ of an electric motor or other load and flywheel diodes $3_a$, $3_b$ and $3_c$ each connected in parallel with a series combination of one reactor and one coil. The coils $5_a$, $5_b$ and $5_c$ may comprise a stator winding of a polyphase AC motor or other electric apparatus utilizing rotating or shifting or travelling field. Preferably, coils $5_a$, $5_b$ and $5_c$ are magnetically coupled with each other to a certain degree to induce such a field.

To analyze the operation of the inverter circuit, it is assumed that the total self inductance of one reactor and one coil in series therewith is denoted by Lo, that the mutual reactance between reactors by Mo and that there is no resistance component. When switch means $2_a$ of the first branch circuit is closed current flows from source 1 through switch means $2_a$, reactor $4_a$ and coil $5_a$ and this current $i_1$ increases at a rate of Eo/Lo where Eo represents the voltage of source 1. When switch means $2_a$ is opened a predetermined interval later, current $i_1 = I_0$ will flow through reactor $4_a$, coil $5_a$ and diode $3_a$ due to the electromagnetic energy stored in the reactor $4_a$ and coil $5_a$. The coil $5_a$ produces magnetic field corresponding to current $I_0$ and the electromagnetic energy stored in the reactor $4_a$ and coil $5_a$ can be expressed by $\frac{1}{2}L_0 I_0^2$. Then, the switch means $2_b$ of the second branch circuit is closed to pass current $i_2$ through reactor $4_b$ and coil $5_b$ from the source 1, but due to the mutual inductance between reactors $4_a$ and $4_b$ the currents $i_1$ and $i_2$ in the first and second branch circuits vary gradually according to the following equations.

$$Lo \frac{di_1}{dt} + Mo \frac{di_2}{dt} = 0 \qquad (1)$$

$$Mo \frac{di_1}{dt} + Lo \frac{di_2}{dt} = E \qquad (2)$$

By solving these equations by denoting the initial value of current $i_1$ by $Io$, we obtain, $$i_1 = Io - \frac{Mo}{Lo^2 - Mo^2} Eot = Io - \frac{Mo}{Lo} i_2 \qquad (3)$$

$$i_2 = \frac{Lo}{Lo^2 - Mo^2} Eot \qquad (4)$$

Thus, $i_2$ increases linearly with time $t$ and $i_1$ decreases linearly from $Io$. Decrease of $i_1$ and increase of $i_2$ mean that the magnetic flux produced by $i_1$ decreases, whereas that produced by $i_2$ increases, so that apparently it can be considered that flux shifts from coil $5_a$ to coil $5_b$. In this manner, by sequentially rendering ON and OFF the switch means $2_a$, $2_b$ and $2_c$, the flux shifts successively from one coil to the other, thus inducing a shifting field. The decrease of current $i_1$ means the decrease of the electromagnetic energy stored in the first branch circuit, but this energy is not sent back to the source but transferred to the second branch circuit through the mutual coupling between coupling reactors $4_a$ and $4_b$ without being dissipated. The invention is based on the unique utilization of the phenomenon wherein the electromagnetic energy that has been stored in one branch circuit is efficiently transferred to another branch circuit without being sent back to the source.

Instead of transferring the electromagnetic energy stored in the first branch circuit to the second branch circuit through the coupling reactors by applying positive voltage upon the second branch circuit, such transfer can also be effected by applying negative voltage upon the first branch circuit thereby forcibly decreasing the current flowing therethrough. Such mode of energy transfer is termed herein a "negative voltage commutation."

FIG. 2 shows a schematic connection diagram of a negative voltage commutation type travelling magnetic field inducing inverter circuit which shows only two branch circuits under commutation. In this type, two diodes 10 and 11, poled as shown, are associated with each switch means. At the commencement of commutation, switch means $2_a$ is maintained in its closed state so that the initial current $Io$ of the first branch circuit circulates through a closed circuit including switch means $2_a$, reactor $4_a$, coil $5_a$ and diode 10. The second branch circuit comprises a closed circuit constituted by reactor $4_b$, coil $5_b$ and diode $3_b$, and the current flowing through this closed circuit at the time of commencement of commutation is of course zero. At a time $t = 0$ when switch means $2_a$ is opened, the first branch circuit will be changed to a closed circuit comprised by reactor $4_a$, coil $5_a$, diode 10, source 1 and diode 11 and the current circulating through this closed circuit tends to decrease by charging source 1. Currents $i_1$ and $i_2$ in the first and second closed circuits vary according to the following equations.

$$Lo \frac{di_1}{dt} + Mo \frac{di_2}{dt} = -Eo \qquad (5)$$

$$Mo \frac{di_1}{dt} + Lo \frac{di_2}{dt} = 0 \qquad (6)$$

By solving these equations under initial conditions of $i_1 = Io$ and $i_2 = o$, we obtain $$i_1 = Io - \frac{Lo}{Lo^2 - Mo^2} Eot \qquad (7)$$

$$i_2 = \frac{Mo}{Lo^2 - Mo^2} Eot \qquad (8)$$

Like the positive potential mode of commutation described above, $i_1$ decreases linearly from the initial value $Io$ whereas $i_2$ increases linearly, thus shifting the magnetic flux from coil $5_a$ to coil $5_b$.

According to this invention, at the time of commutation, negative voltage is applied upon the first closed circuit and concurrently therewith positive voltage is applied upon the second closed circuit, such mode of commutation being termed herein a "positive-negative voltage commutation." This mode of commutation accelerates commutation and thus decreases commutation period.

FIG. 3 shows a basic connection diagram of a positive-negative voltage commutation type travelling magnetic field inducing inverter circuit embodying the invention in which one ends of coils $5_a$, $5_b$ and $5_c$ are connected to switch means 12 and 13 through reactors 4 and 8 which are coupled to each other and six controlled rectifier elements, for example transistors or thyristors 15 through 20 which are connected in a full wave rectifier configuration so that currents flow in both directions through coils $5_a$, $5_b$ and $5_c$. Switch means 12 and 13 may be controllable power semiconductor elements such as well known thyristor choppers or transistor choppers as has been pointed out in connection with FIG. 1. The neutral point of these coils are connected to the junctures between switch means 12 and 13 and reactors 4 and 8, respectively, through commutation thyristors 22 and 21 which act as flywheel diodes for a certain period. Diodes 10 and 11 are connected in the same manner as those shown in FIG. 2 and function to pass circulating current and regenerated current. Since thyristors 15 through 20 are connected in a full wave rectifier configuration, it is necessary to use only two switch means which may be well known thyristor choppers.

Figure 4:
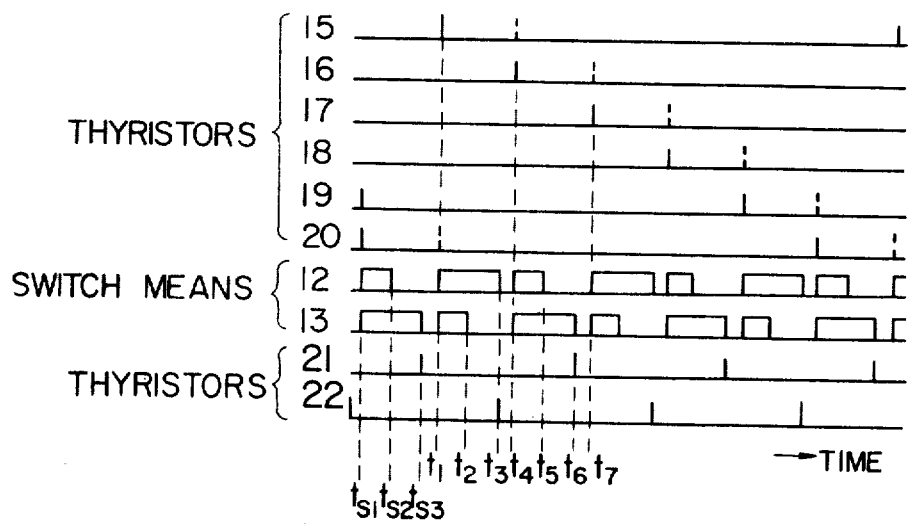
FIG. 4 is a diagram showing a control pulse sequence of the inverter circuit shown in FIG. 3.
Figure 5:
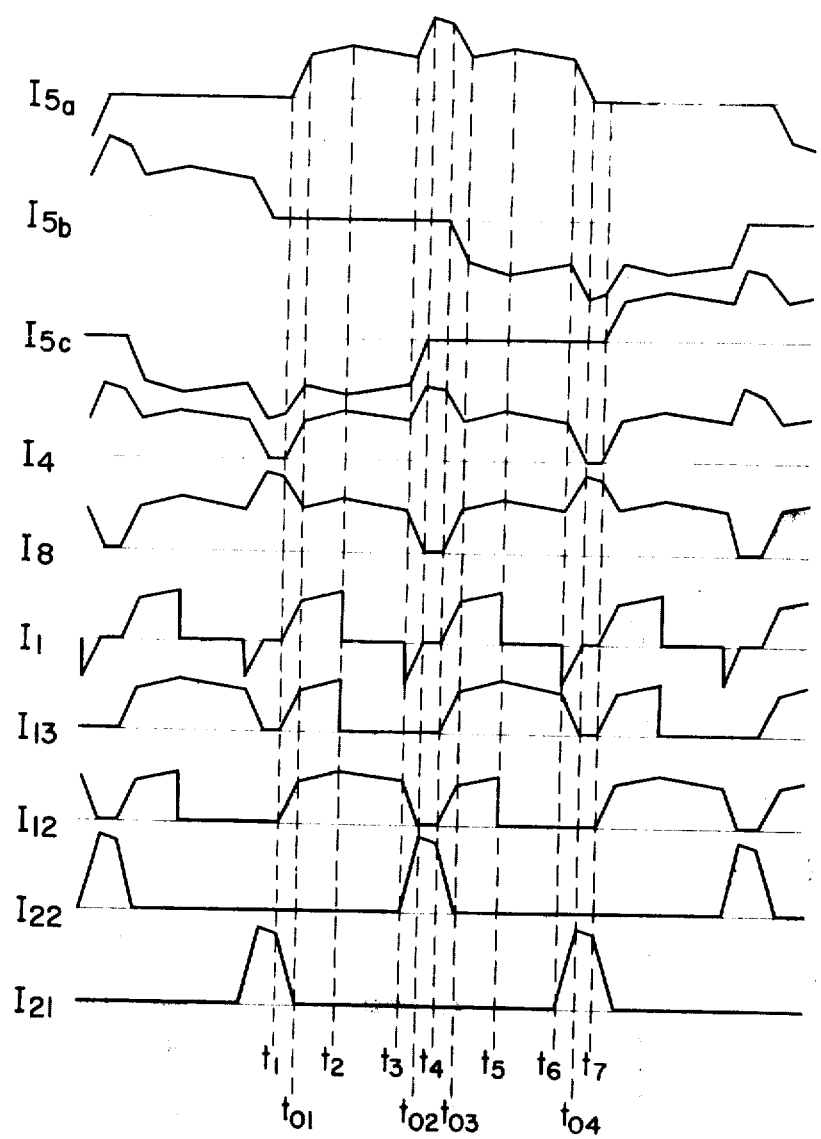
FIG. 5 shows current waveforms at various portions of the inverter circuit shown in FIG. 3.

FIG. 4 shows one example of the sequence of pulses utilized to control the inverter circuit shown in FIG. 3, and FIG. 5 shows current waveforms flowing through various components of the inverter circuit shown in FIG. 3 controlled by the pulses shown in FIG. 4 under an operating condition.

At a time $t_{s1}$ (FIG. 4) thyristors 19 and 20 and switch means 12 and 13 are turned ON simultaneously to form a closed circuit across source 1 and extending through switch means 12, reactor 4, thyristor 19, coils $5_b$ and $5_c$, thyristor 20, reactor 8 and switch means 13, thereby starting the inverter circuit. At a time $t_{s2}$, switch means 12 is opened to disconnect the circuit just traced from source 1. Then current circulates through a closed circuit extending through switch means 13, diode 11, reactor 4, thyristor 19, coils $5_b$ and $5_c$, thyristor 20 and reactor 8 due to the electromagnetic energy stored in reactors 4 and 8 and coils $5_b$ and $5_c$. The current attenuates gradually. At a time $t_{s3}$, switch means 13 is opened whereas the thyristor 21 is turned ON to form a closed circuit extending through thyristor 21, coil $5_c$, thyristor 20 and reactor 8 whereby current flows through this closed circuit.

Above decription relates to the starting operation before normal running state. The operation during normal running during an interval from $t_1$ through $t_7$ is as follows. Immediately prior to time $t_1$, current $I_{5c}$ is circulating through the closed circuit just described which includes $5_c$, 20, 8 and 21. At time $t_1$, when thyristor 15 and switch means 12 and 13 are turned ON simultaneously, a closed circuit is closed including switch means 12, reactor 4, thyristor 15, coil $5_a$, thyristor 21 and switch means 13. Of these circuit elements, commutation thyristor 21 is poled oppositely to its direction of normal current flow. However, since the circulating current $T_{5a}$ is flowing through thyristor 21 in the forward direction, current $I_{5a}$ can flow through the closed circuit just traced until the current $I_{5a}$ flowing through this closed circuit exceeds the circulating current $I_{5c}$. Due to close magnetic coupling between reactors 4 and 8, a positive voltage commutation mode occurs between the closed circuit including the elements $5_c$, 20, 8 and 21 and that including the elements 1, 12, 4, 15, $5_a$, 21 and 13 whereby the current $I_{5c}$ circulating through the former closed circuit decreases, whereas the current $I_{5a}$ circulating through the latter closed circuit increases. At a time $t_{01}$, currents $I_{5a}$ and $I_{5c}$ become equal, so that commutation thyristor 21 turns OFF because it can not pass current in the reverse direction. Then, current flows through a closed circuit extending through source 1, switch means 12, reactor 4, thyristor 15, coils $5_a$ and $5_c$, thyristor 20, reactor 8 and switch means 13. This current increases gradually at a rate of build up determined by the circuit constants of this closed circuit. At a time $t_3$, the switch means 13 is opened to disconnect the inverter circuit from source 1. Then, current flows through a closed circuit extending through switch means 12, reactor 4, thyristor 15, coils $5_a$ and $5_b$, reactor 8 and diode 10 and this current attenuates gradually. When switch means 12 is opened and commutation thyristor 22 is turned ON at the time $t_3$ the following two closed circuits are formed, one including diode 11, thyristor 22, coil $5_b$, thyristor 20, reactor 8, diode 10 and source 1 and the other including reactor 4, thyristor 15, coil $5_a$ and commutation thyristor 22. For the reason described above, thyristor 22 can pass current in the reverse direction. Then, by the action of mutually coupled reactors 4 and 8, a negative voltage commutation mode of operation takes place and the current $I_{5a}$ flowing through the former closed circuit decreases whereas the current $I_{5a}$ flowing through the latter closed circuit increases from the same initial current value. At a time $t_{02}$, current $I_{5c}$ decreases to zero whereby the transfer of the energy from the former closed circuit to the latter closed circuit terminates, whereas current $I_{5a}$ decreases gradually at a rate determined by the circuit constants. This condition is the same as that prevailed immediately prior to time $t_1$ wherein current $I_{5c}$ is circulating through the closed circuit including $5_c$, 20, 8 and 21. During an interval of from $t_4$ to $t_{04}$ current varies in the same manner as in interval of from $t_1$ to $t_{02}$ in which current has been commutated from coil $5_c$ to coil $5_a$ so that current is commutated from coil $5_a$ to coil $5_b$. Current $I_{5a}$ decreases to zero at a time $t_{04}$. At a time $t_7$ a new commutation takes place but the interval between $t_1$ and $t_7$ is equal to ⅓ of one cycle which corresponds to 120 electrical degrees. As described above, currents are transferred and commutated between three coils $5_a$, $5_b$ and $5_c$ with waveforms $I_{5a}$, $I_{5b}$ and $I_{5c}$ shown in FIG. 5. These currents correspond to three phase symmetrical alternating currents each having a conduction period of 120 electrical degrees. If coils $5_a$, $5_b$ and $5_c$ correspond to phases U,V and W of an armature winding of a three phase alternating current motor there will be formed a shifting field or a rotating field. The intensity of the shifting field can be adjusted by varying the ratio of interval $t_1 - t_3$ to interval $t_1 - t_2$. Thus, for example, since the increase of the proportion of interval $t_1 - t_2$ means an increase in the proportion of current increasing period with reference to one cycle, this increase results in the increase of the mean current value thus producing an intense shifting field. In addition, since the period $t_1 - t_7$ corresponds to ⅓ cycle of the shifting field it is possible to vary the speed of the shifting field by adjusting this period.

Instead of turning OFF switch means 12 at time $t_3$ and simultaneously turning ON thyristor 22, if switch means 12 is turned OFF prior to the turning ON of thyristor 22, the current that circulates through the closed circuit including elements 12, 4, 15, $5_a$, $5_c$, 20, 8 and 10 after time $t_3$ will flow through a circuit including elements 1, 11, 4, 15, $5_a$, $5_c$, 20, 8 and 10, thus charging the source 1. Under these conditions the motor acts as a generator to return the power to the source, thus providing a regenerative braking.

In the embodiment shown in FIG. 3, the number of coils is three, but it will be clear that any number of coils may be used by increasing the number of branches of the rectifier thyristors connected in a full wave rectifier configuration, provided that the number of coils is equal to an odd number. Furthermore, in the pulse sequence diagram shown in FIG. 4, the ignition pulse for thyristor 19 which occurs at time $t_{s1}$ is necessary to act as a starting pulse, but the pulses shown by dotted lines are not always necessary. However, these pulses are necessary if there is a fear that the thyristor may turn OFF due to the decrease in the current circulating through a closed circuit including a free wheeling diode caused by circuit conditions.

Figure 6:
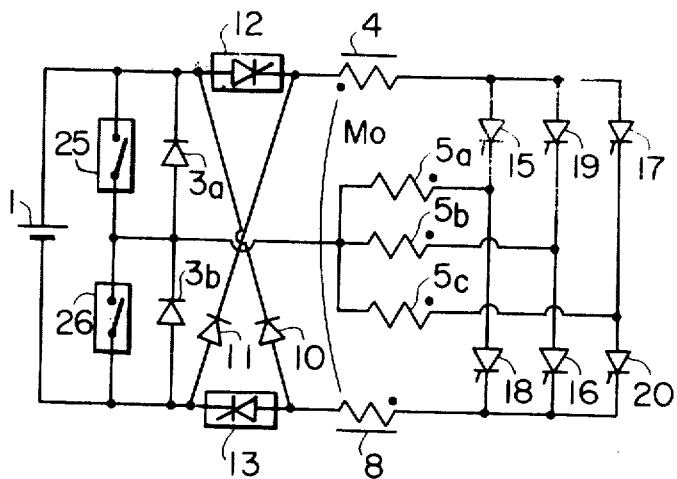
FIG. 6 shows a connection diagram of a modified embodiment of this invention.
Figure 7:
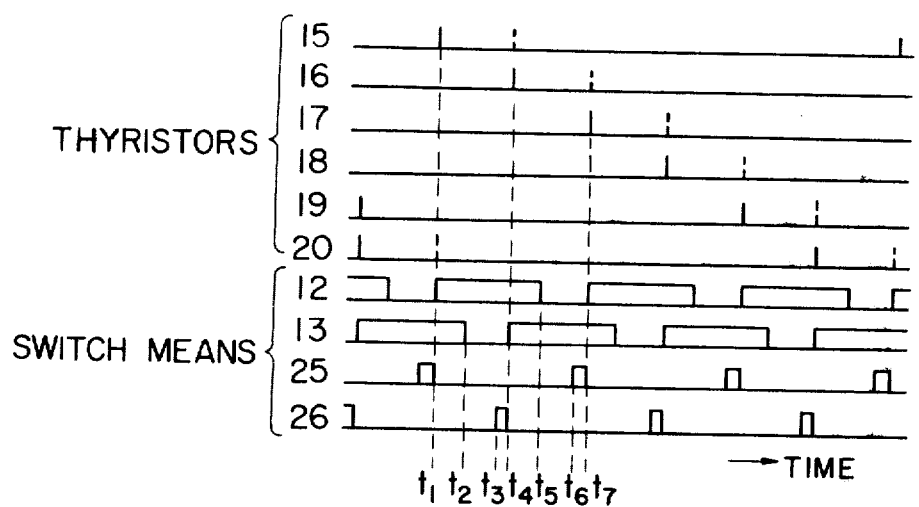
FIG. 7 is a diagram showing a control pulse sequence of the inverter circuit shown in FIG. 6
Figure 8:
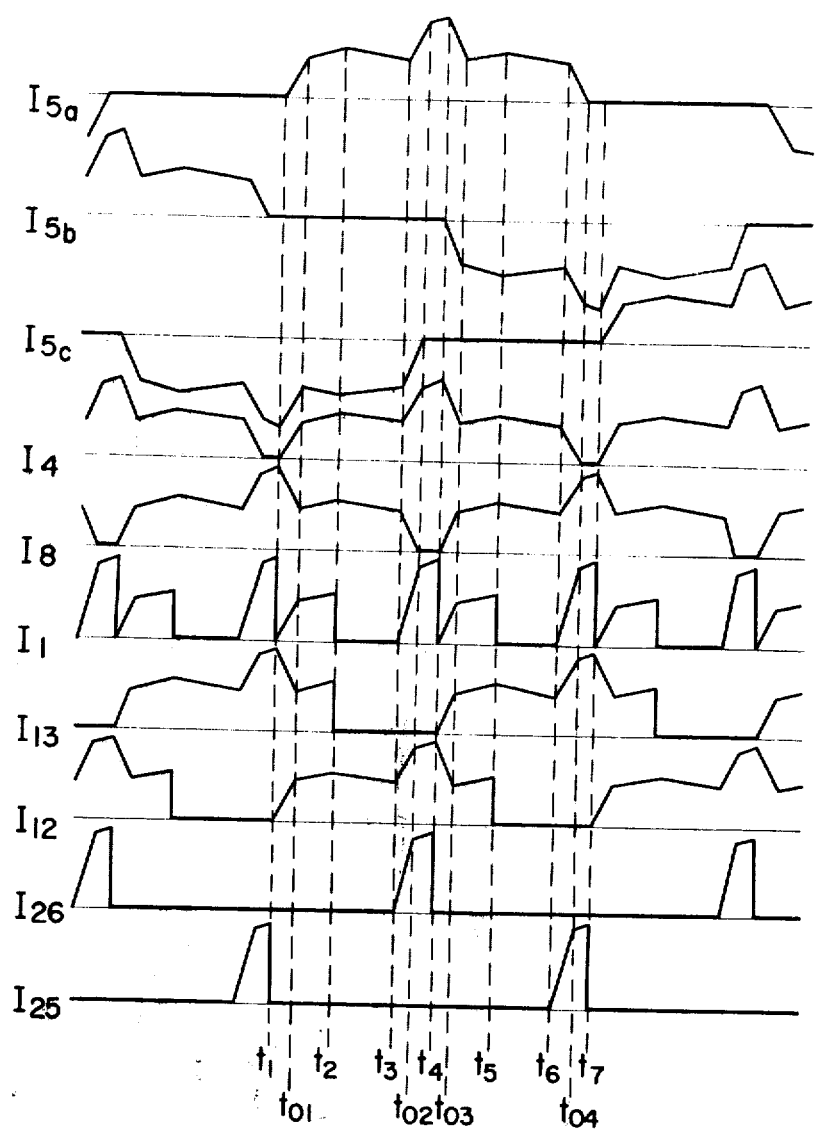
FIG. 8 shows current waveforms at various portions of the inverter circuit shown in FIG. 6.

FIG. 6 illustrates a modified embodiment of this invention which operates with the positive-negative voltage commutation and positive voltage commutation modes. The inverter circuit shown in FIG. 6 is similar to that shown in FIG. 3 except that additional switch means 25 and 26 are connected in series across the source 1 and that instead of commutation thyristors 21 and 22 commutation diodes $3_a$ and $3_b$ are connected in series and directly across the source. One example of a diagram of the pulse sequence utilized to control the inverter circuit shown in FIG. 6 is illustrated in FIG. 7, which differs from that shown in FIG. 4 only during an interval of from $t_3$ to $t_4$. Accordingly, the difference in the operations of the inverter circuits shown in FIGS. 4 and 6 occurs during an interval of from $t_3$ to $t_4$, so that only the operation occurring during interval $t_3 - t_4$ of FIG. 8 will be described, which shows current waveforms of various elements shown in FIG. 6. Immediately prior to time $t_3$, current circulates through a closed circuit extending through switch means 12, reactor 4, thyristor 15, coils $5_a$ and $5_c$, thyristor 20, reactor 8 and diode 10. When switch means 26 is closed at time $t_3$ two closed circuits are formed, one including switch means 26, coil $5_c$, thyristor 20, reactor 8, diode 10 and source 1 and operating to charge the source 1 and the other including source 1, switch means 12, reactor 4, thyristor 15, coil $5_a$ and switch means 26 and operating to energize coil $5_a$ from source 1. Due to the mutual coupling between reactors 4 and 8, a positivenegative voltage commutation mode is effected between these two closed circuts whereby the current $I_{5c}$ flowing through the former closed circuit decreases and the current $I_{5a}$ flowing through the latter closed circuit increases. Current $I_{5c}$ decreases to zero at time $t_{o2}$, thereafter current $I_{5a}$ builds up at a rate determined by the circuit constants. Since switch means 26 is opened at a time $t_4$, this current will then circulate through a closed circuit including switch means 12, reactor 4, thyristor 15, coil $5_a$ and diode $3_a$ whereby the same operation as that has been described in connection with FIG. 3 is performed. Waveforms of currents $I_{5a}$, $I_{5b}$ and $I_{5c}$ shown in FIG. 8 differ slightly from each other during period $t_3 - t_4$ and are substantially identical to those shown in FIG. 5. In this manner, the inverter circuit shown in FIG. 6 operates in the same manner as the inverter circuit shown in FIG. 3. As can be noted from the foregoing description it will be noted that the invention provides a novel inverter circuit capable of producing a shifting or rotating magnetic field having any desired intensity and speed from a source of constant direct current voltage. The inverter circuit of this invention is more advantageous in the ease of control, the number of elements, the magnitude of the positive and negative voltages impressed upon the elements and efficiency than various types of inverters, for example a system of driving an AC motor by means of a polyphase McMurray type inverter utilizing a pulse width control. Moreover, in the inverter circuit of this invention, the energy corresponding to the wattless power of an AC circuit is stored in the coupling reactors and field inducing coils in the form of electromagnetic energy and since this enerenergy is shifted successively to adjacent field inducing coils, it is not necessary to return this energy to the source at each half cycle. Accordingly, it is possible to operate the inverter even when the power factor of the motor is less than unity without providing any power factor compensating means, such as capacitors.

Although the invention has been described in connection with an AC motor it will be clear that the invention is also applicable to operate a linear motor.

I claim:

1. A travelling magnetic field inducing inverter circuit comprising:
   a source of direct current,
   polyphase magnetic field inducing coils connected in star;
   a plurality of controlled rectifier elements connected to the free terminals of said coils in a full wave rectifier configuration;
   a first branch circuit including a first switch means and a first reactor which are connected in series between one pole of said source and the anode electrodes of one group of said rectifier elements;
   a second branch circuit including a second switch means and a second reactor which are connected in series between the other pole of said source and the cathode electrodes of the other group of said rectifier elements;
   said first and second reactors being magnetically coupled with each other;
   a first diode connected between the juncture between said first switch means and said first reactor and said other pole of said source;
   a second diode connected between the juncture between said second switch means and said second reactor and said one pole of said source;
   a pair of unidirectional current conducting elements serially connected across said first and second branch circuits;
   said unidirectional current conducting elements being poled not to pass current from said source;
   means to connect the neutral point of said star connected coils to the juncture between said unidirectional current conducting elements;
   and means for rendering ON and OFF said first and second switch means and for rendering conductive said rectifier elements in a predetermined sequence to cause said coils to create travelling magnetic field.

2. The inverter circuit according to claim 1 wherein said coils comprise a stator winding of a polyphase alternating current motor and create rotating field.

3. The inverter circuit according to claim 1 wherein said first and second switch means comprise semiconductor choppers.

4. The inverter circuit according to claim 1 wherein said unidirectional current conducting elements comprise thyristors which are connected in series across the juncture between said first switch means and said first reactor and the juncture between said second switch means and said second reactor.

5. The inverter circuit according to claim 1 wherein said unidirectional current conducting elements comprise diodes which are connected in series directly across said source, and a pair of switch means which are connected in series across said source with the juncture between said switch means connected to the neutral point of said star connected coils.

6. The inverter circuit according to claim 1 wherein said pair of switch means comprise semiconductor choppers.

* * * * *

UNITED STATES PATENT AND TRADEMARK OFFICE
CERTIFICATE OF CORRECTION

PATENT NO. : 3,895,274
DATED : July 15, 1975
INVENTOR(S) : Tunghai CHIN

It is certified that error appears in the above-identified patent and that said Letters Patent are hereby corrected as shown below:

Item [73]  The assignee should be changed from:

"Tokyo Shibaura Denki Kabushiki Kausha, Kawasaki, Japan"

To:

-- Tunghai Chin and Tokyo Shibaura Denki Kabushiki Kaisha, Kawasaki-Shi, Japan --.

Signed and Sealed this thirtieth Day of March 1976

[SEAL]

Attest:

RUTH C. MASON
*Attesting Officer*

C. MARSHALL DANN
*Commissioner of Patents and Trademarks*